United States Patent [19]
Herndon, Jr.

[11] 4,087,808
[45] May 2, 1978

[54] DISPLAY MONITOR FOR COMPUTER NUMERICAL CONTROL SYSTEMS

[75] Inventor: Lee R. Herndon, Jr., Birmingham, Mich.

[73] Assignee: Vega Servo Control, Inc., Troy, Mich.

[21] Appl. No.: 622,552

[22] Filed: Oct. 15, 1975

[51] Int. Cl.[2] ............................................ G06K 15/20
[52] U.S. Cl. .............................. 340/324 AD; 315/367
[58] Field of Search ........... 340/324 AD, 154, 324 A; 315/367; 354/6, 7

[56] References Cited

U.S. PATENT DOCUMENTS

| | | | |
|---|---|---|---|
| 3,528,068 | 9/1970 | Johnson | 340/324 AD |
| 3,581,290 | 5/1971 | Sugarman | 340/172.5 |
| 3,614,767 | 10/1971 | Carrell | 340/324 AD |
| 3,659,283 | 4/1972 | Ophir | 340/324 AD |

*Primary Examiner*—David L. Trafton
*Attorney, Agent, or Firm*—Reising, Ethington, Barnard

[57] ABSTRACT

A cathode ray tube display for use in computer numerical control systems is provided with means for selectively displaying alphanumeric characters in normal size or in magnified size. An address generator is connected with the character code memory and is read out in synchronism with the sweep of the cathode ray under the control of a dot clock. The address generator includes means for selectively dividing the dot clock count by a predetermined magnification factor so that the character column address and the character row address are incremented at a reduced rate corresponding to the magnification factor. The output of the character generator is supplied through a shift register to a video amplifier to produce the dot signal. The shift rate and the rate of advance of the character generator from one dot row to the next are divided by the magnification factor for displaying the magnified character on the screen of the tube.

2 Claims, 6 Drawing Figures

DISPLAY MONITOR FOR COMPUTER NUMERICAL CONTROL SYSTEMS

FIELD OF THE INVENTION

This invention relates to display systems and more particularly to a cathode ray tube monitor for a computer numerical control system.

BACKGROUND OF THE INVENTION

In prior art numerical control systems, the operator's display panel typically includes an alpha-numeric character display to provide the operator with information contained in the control system memory. Such a display is provided by means of individual character display devices such as "Nixie" tube displays or light emitting diode displays, which can be made large enough and bright enough for easy viewing by the operator. The prior art has also utilized a cathode ray tube display which has the advantage of providing more data to the operator; however, it has a disadvantage in that normal character is too small for easy viewing by the operator.

BRIEF SUMMARY OF THE INVENTION

In accordance with this invention, a cathode ray tube display with character magnification is provided for computer numerical control systems. With a cathode ray tube monitor on the operating panel, operating display pages are selectably presented on the monitor and contain certain operating information. This information, supplied from the computer and continuously updated, is presented in the form of alphanumeric characters. A manual control permits the operator to cause magnification of the character size in predetermined character rows, i.e. the operator may switch the character size from normal size to magnified size. In general, this is accomplished by means connected with the address generator for selectably changing the divisor in the frequency divider string for the dot clock. More particularly, the address generator is connected with the character code memory which is continuously updated by the computer and is read out in synchronism with the sweep of the cathode ray under the control of the dot clock; the address generator includes means for selectively dividing the dot clock count by a predetermined magnification factor so that the character column address and the character row address are incremented at a reduced rate corresponding to the magnification factor. Preferably, to obtain a magnification factor of n of the normal sized character, the character column address is divided by n and the character row address is divided by $n^2$ to produce the magnified character from the character generator. The output of the character generator is supplied through a shift register to a video amplifier to produce the dot signal and the shift rate is divided by n for displaying the magnified character on the cathode ray tube.

A more complete understanding of this invention may be obtained from the detailed description that follows taken with the accompanying drawings in which.

Figure 1:
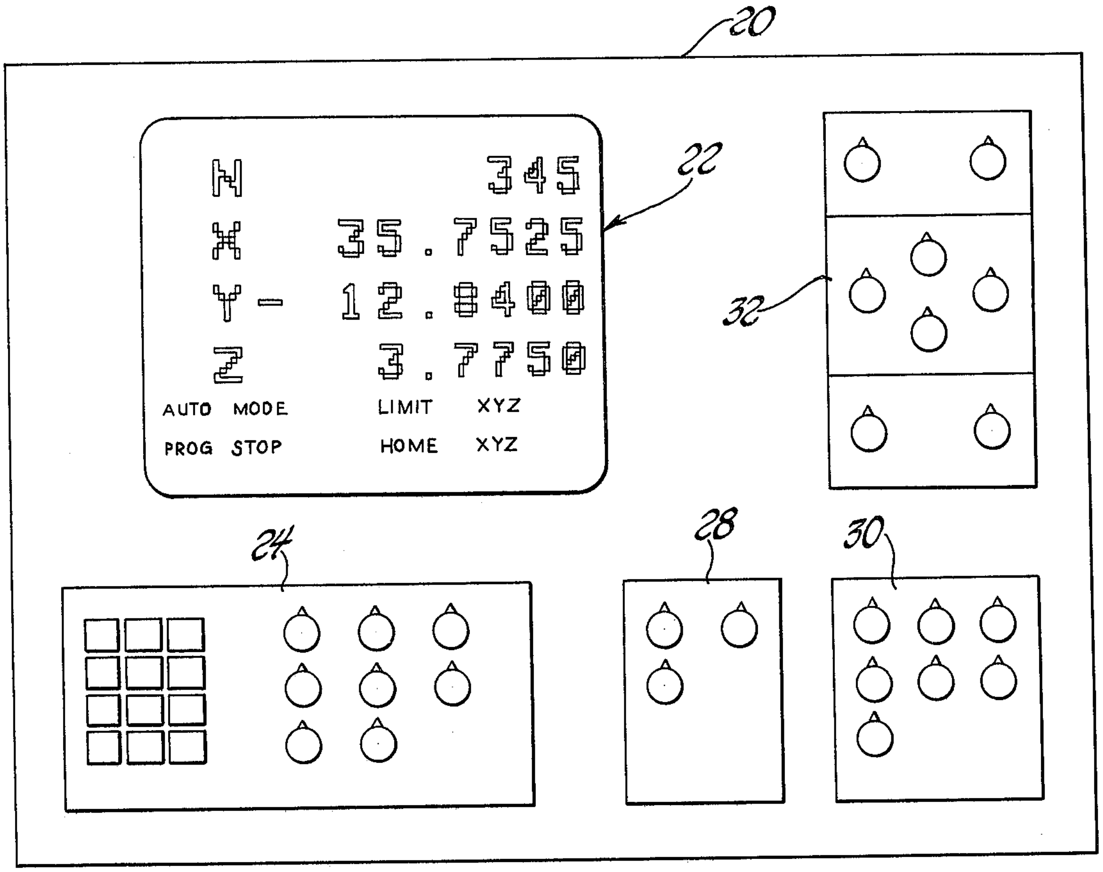
FIG. 1 shows an operating panel of a computer numerical control system including the cathode ray tube monitor of this invention.

Referring now to the drawings, there is shown an illustrative embodiment of the invention in a monitor display for a computer numerical control (CNC) system. FIG. 1 shows a control system operating panel 20 which includes a video monitor or cathode ray tube (CRT) 22. The panel also includes a group of controls 24 for entering data when the system is placed in the edit, digitize and manual data input modes. The panel also includes groups of controls 28, 30 and 32 for manual control.

The cathode ray tube 22, as depicted in FIG. 1, shows an operating display page which displays the instruction or command sequence number, N, and the command positions for the X, Y and Z axes in alphanumeric characters of triple size format. The tube also displays the selected operating mode, program stop, limit switch activation, and axis home in a normal size format.

Figure 2:
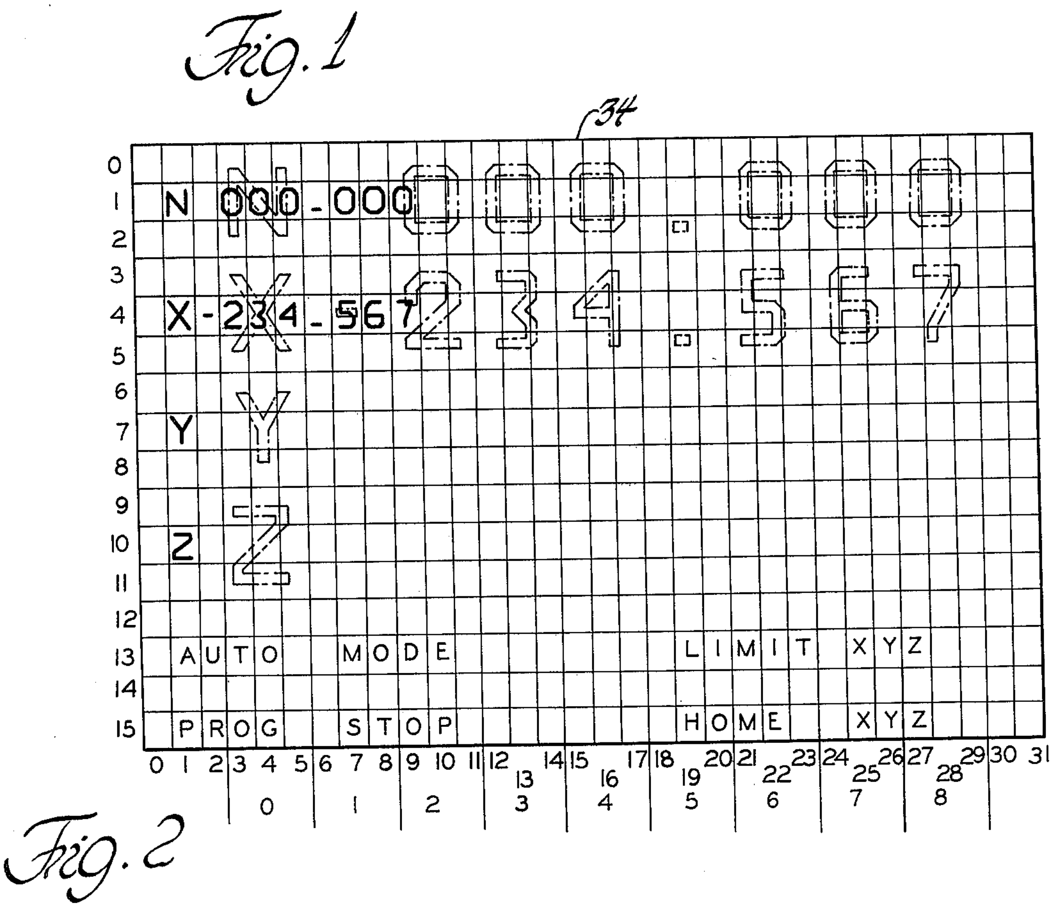
FIG. 2 is a diagrammatic representation of normal and magnified characters on the cathode ray tube.

A further detail of the monitor 22 is represented in FIG. 2 in which the screen 34 of the cathode ray tube is shown with a superimposed rectangular grid which divides the screen into 32 columns, numbered 0 through 31, and 16 rows, numbered 0 through 15. The grid thus defines a total of 512 boxes, each having a unique column and row address, and being of a size adapted to contain one alphanumeric character of normal size. Examples of normal size characters are given by those characters in solid line. Examples of magnified-size (triple size) characters are given by those characters in phantom line. It is noted, for example, that the character "N" in normal size occupies a single box whereas the same character in triple size occupies nine boxes, since the linear dimensions are magnified by a factor of 3.

Figure 3:
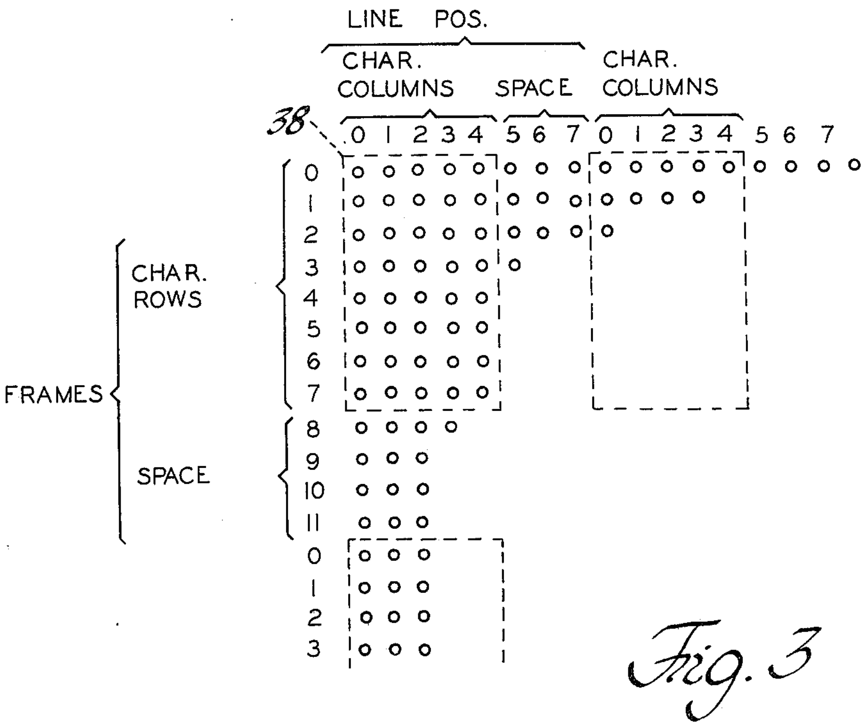
FIG. 3 shows a fragmentary portion of the dot pattern on the face of the cathode ray tube.

Additional details of the cathode ray tube screen are illustrated in FIG. 3. The cathode ray tube screen is of conventional structure and comprises multiple columns and rows of luminescent dots in a rectangular array. In the illustrative example, the screen has at least 256 dots in each row and at least 192 dots in each column. The standard alphanumeric character in the illustrative embodiment requires five columns for the character itself, plus three additional columns allotted to intercharacter spacing making a total of eight dot columns per character. It also requires eight rows of dots for the character itself, plus four additional rows for interline spacing, making a total of twelve dot lines per character. As shown in FIG. 3, a character matrix 38 (outlined by dashed lines) is five dot columns by eight dot rows. Consequently, with the intercharacter spacing and the interline spacing, the screen of the cathode ray tube provides 32 columns of character matrices and 16 rows of character matrices.

Figure 4:
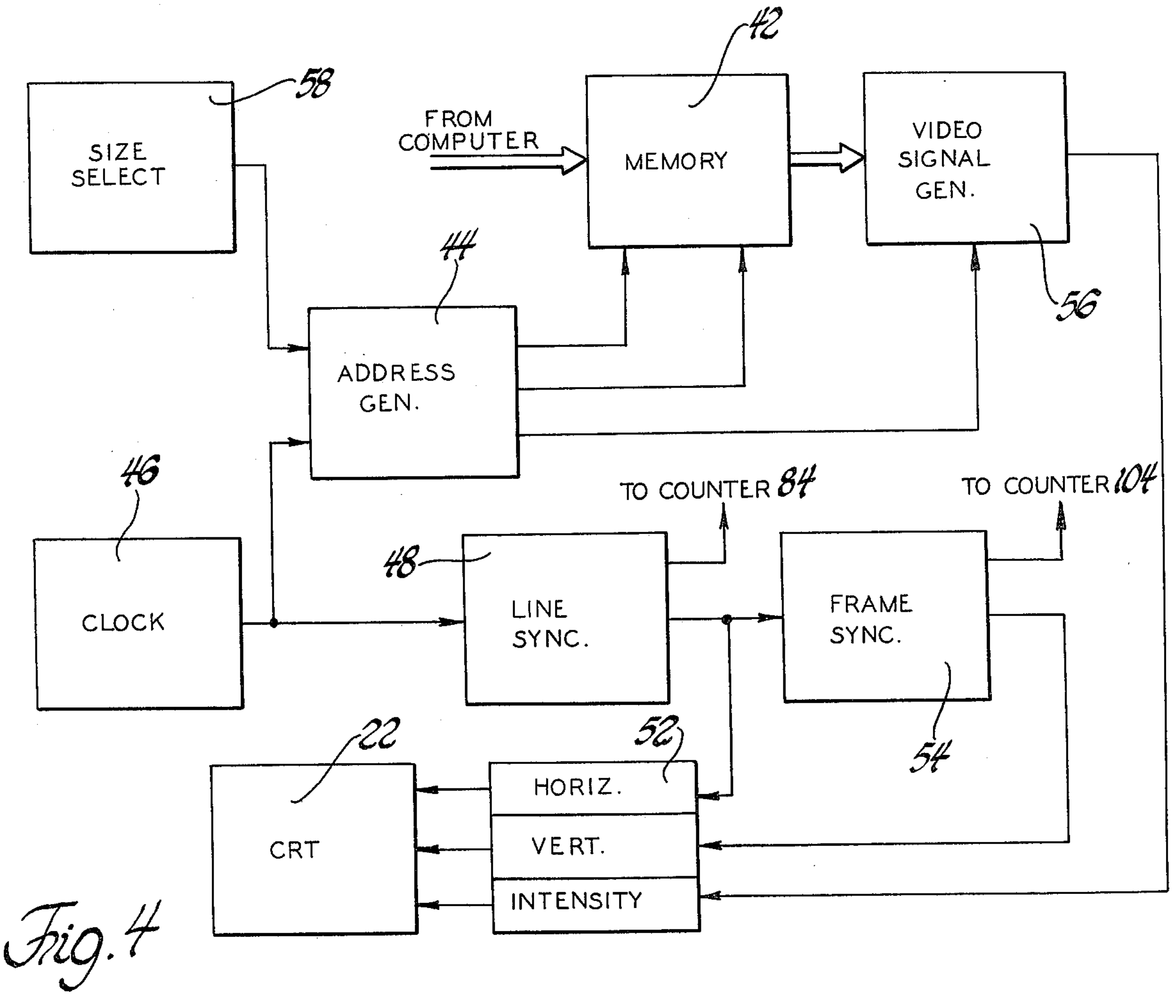
FIG. 4 is a block diagram of a monitor display control system including the subject invention.

In FIG. 4, a monitor display control system which incorporates the subject invention is shown in block diagram. The control system comprises a memory 42 which is adapted to store a number of alphanumeric characters which are to be displayed on the video monitor or cathode ray tube 22. The memory has a storage capacity of 512 six-bit words each of which represents an alphanumeric character corresponding to one of the 512 character matrix positions on the screen of the cathode ray tube in the monitor. The memory 42 is initially loaded by data input from a computer in accordance with the initial data to be displayed. It is continuously updated during operation by the computer in a well known manner. For example, in a two-axis contouring machine, the CNC system continuously supplies from the part program, the X-axis and Y-axis command signals. These command signals, supplied in succession to the machine controller, represent the X-axis and Y-axis coordinates of the points on the path which the tool is to follow. The operating display page of the monitor is adapted to show, in real time, the X and Y coordinates of the actual position of the tool as it moves along the commanded path. The X and Y coordinates are therefore continuously changing and the monitor display must be changed therewith to show the current tool position. It is noted that the X-axis coordinate is given by a six digit decimal number and each numeric character thereof has an assigned address in the memory. Accordingly, as the X-axis position signal changes, the characters in the assigned memory addresses will be changed under computer control. The same arrangement is provided, of course, for the Y-axis position as well as other data to be displayed on the operating page.

In order to produce the desired character array on the cathode ray tube 22, the character codes must be read out of the memory 42 in a synchronized relationship with the scanning of the raster by the electron beam in the cathode ray tube. For this purpose, an address generator 44 is driven by a dot clock 46 which governs the scan rate of the cathode ray tube. The address generator 44 produces a character address in timed relation with the scan of the cathode ray tube. A video circuit 52 includes horizontal and vertical linear time base generators and a beam intensity amplifier. The output of the dot clock 46 is applied to a line or horizontal synchronizing circuit 48 and the output thereof is applied to the horizontal time base generator to synchronize it with the dot clock. The output of the line synchronizing circuit 48 is applied to a frame or vertical synchronizing circuit 54 and the output thereof is applied to the vertical time base generator to synchronize it with the dot clock.

The character codes which are read from the memory 42 in timed succession under the control of the address generator 44 are utilized to control the generation of alphanumeric characters corresponding thereto. For this purpose the output of the memory 42 is applied to a video signal generator 56 which has its output connected to the beam intensity amplifier of the video circuit 52. The video signal generator produces a dot signal output, either high or low, for each dot on the screen of the cathode ray tube as the dots are successively intercepted by the electron beam in its scanning motion. The dot signal causes each dot to be bright or dark according to the character which is to be displayed, as dictated by the memory for the given character matrix location on the screen of the cathode ray tube.

In accordance with this invention a display control system, as depicted in FIG. 4, includes character magnification or size selecting means 58 connected with the address generator 44. The size selecting means, as will be discussed below, is manually actuable to cause the characters to be displayed on the monitor in either a normal size format or a magnified size format.

Figure 5:
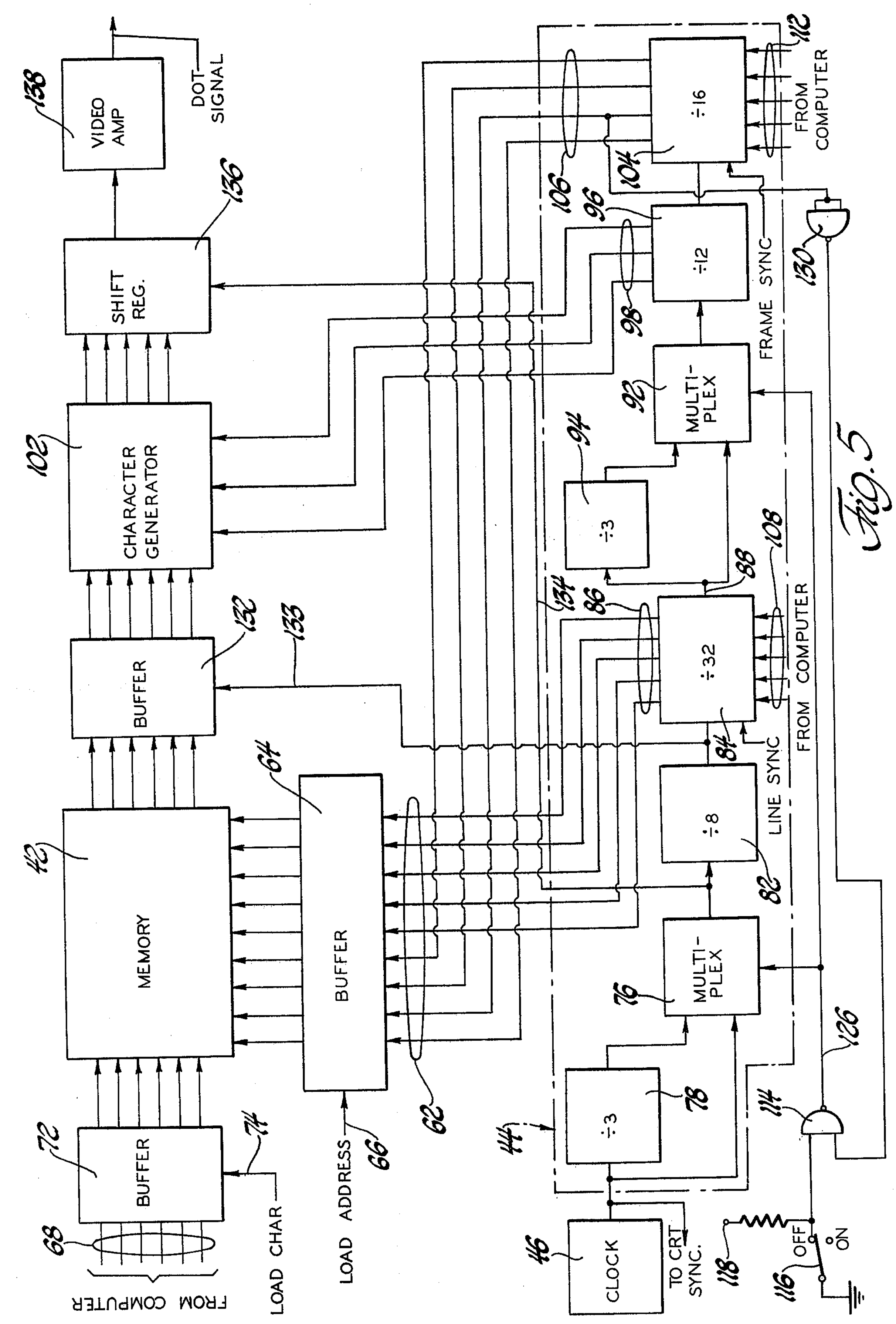
FIG. 5 is a block diagram showing further detail of the subject invention.

The display control system is disclosed in greater detail in FIG. 5. The memory 42 is a random access memory with storage for 512 6-bit characters. The character position address is a 9-bit word which is transferred in parallel form from the address generator on conductor group 62 through an address buffer 64 to the memory 42. The transfer of a character address to memory is initiated by a "load address" signal or instruction as indicated by the input 66. The character data is transferred from the computer in the form of 6-bit words, each word representing a character code. The character data is transferred in parallel on conductor group 68 to an input character buffer 72 and thence to the memory 42. The transfer of character data is initiated by a "load character" signal or instruction as indicated by the input 74. The loading of character data into the memory 42 may be controlled manually or, alternatively, it may be effected under automatic timing. When a character address is transferred, succeeding data loads will automatically increment the character address if the data loads occur within short enough time intervals.

The display monitor is operated under the control of the address generator 44. The address generator comprises a series of counters which are responsive to the output of the dot clock 46 and which are selectively connected with the memory 42. The dot clock 46 is connected directly to a first input of a multiplexer 76 and is connected through a frequency divider 78 to a second input of the multiplexer 76. The output of the multiplexer 76 is applied through a frequency divider 82 to a counter 84. The counter 84 is a five-stage binary counter with the output count applied through a conductor group 86 to the buffer 64 as the line position address, i.e. the number of the character column in the line. The counter 84 has a divide-by-32 output on conductor 88 which is connected directly to a first input of a multiplexer 92 and which is applied through a frequency divider 94 to a second input of the multiplexer 92. The output of the multiplexer 92 is applied to a three-stage binary counter 96 and the output count thereof on conductor group 98 represents the dot line number within a character. This count is applied to one set of inputs of a character generator 102. The divide-by-12 output of the counter 96 is applied to a four-stage counter 104 and the output count thereof is applied through a conductor group 106 to the buffer 64 as the frame position address, i.e. the number of the character row in the frame.

The line position address produced by the counter 84 and the frame position address produced by the counter 104 comprise the character position address applied thrugh the buffer 64 to the memory 42. It is noted that the counter 84 has preset inputs connected by a conductor group 108 with the computer and the counter 104 has preset inputs which are connected by conductor group 112 with the computer. When the memory 42 is to be loaded with character data, the memory is addressed by presetting these two counters.

The size select control 58 is adapted to modify the address generator so that the characters displayed on the monitor will be either normal size format or a magnified size format. The control 58 comprises a NAND gate 114 and a manual switch 116. The switch 116 has a movable contact, a fixed contact which is labelled "ON" and a fixed contact which is labelled "OFF" and provides for manual selection of operation in a "normal mode" or a "magnify mode". The movable contact is connected to ground and the "ON" contact is unconnected, or floating. The "OFF" contact is connected to one input of the NAND gate 114 and is also connected to a logic level voltage source 118, which supplies a logical high, through a resistor. The NAND gate 114 is provided for the purpose of changing automatically from one character size to another at a given position in the frame. The other input of the NAND gate 114 is connected to the output of an inverter 130 which has its input connected with the next most significant bit output of the frame position address on counter 104. The output of the NAND gate 114 is connected by a conductor 126 to the selector input of the multiplexer 76 and to the selector input of the multiplexer 92. When the switch 116 is in the "OFF" position, the output of the NAND gate 114 is high and the first inputs of multiplexers 76 and 92 are selected. When the switch 116 is in the "ON" position, assuming the output of the inverter 130 is high, the output of the NAND gate 114 will be low and the second inputs of the multiplexers are selected. The size select control thus operates to selectively insert both dividers 78 and 94 into the respective multiplexer inputs or to remove both dividers.

The output of the memory 42, in the form of a character code, is applied to a buffer 132. The buffer 132 is outputted under the control of a line position-transfer signal which is derived from the divider 82 and applied through a conductor 133. The output of the buffer is applied to the character generator 102. The output of the character generator is applied to a shift register 136 which has its shift input connected with the shift clock signal through the conductor 134. The output of the shift register is applied to the input of a video amplifier 138 which produces the dot signal adapted for application to the video circuit 52 of FIG. 4.

Figure 6:
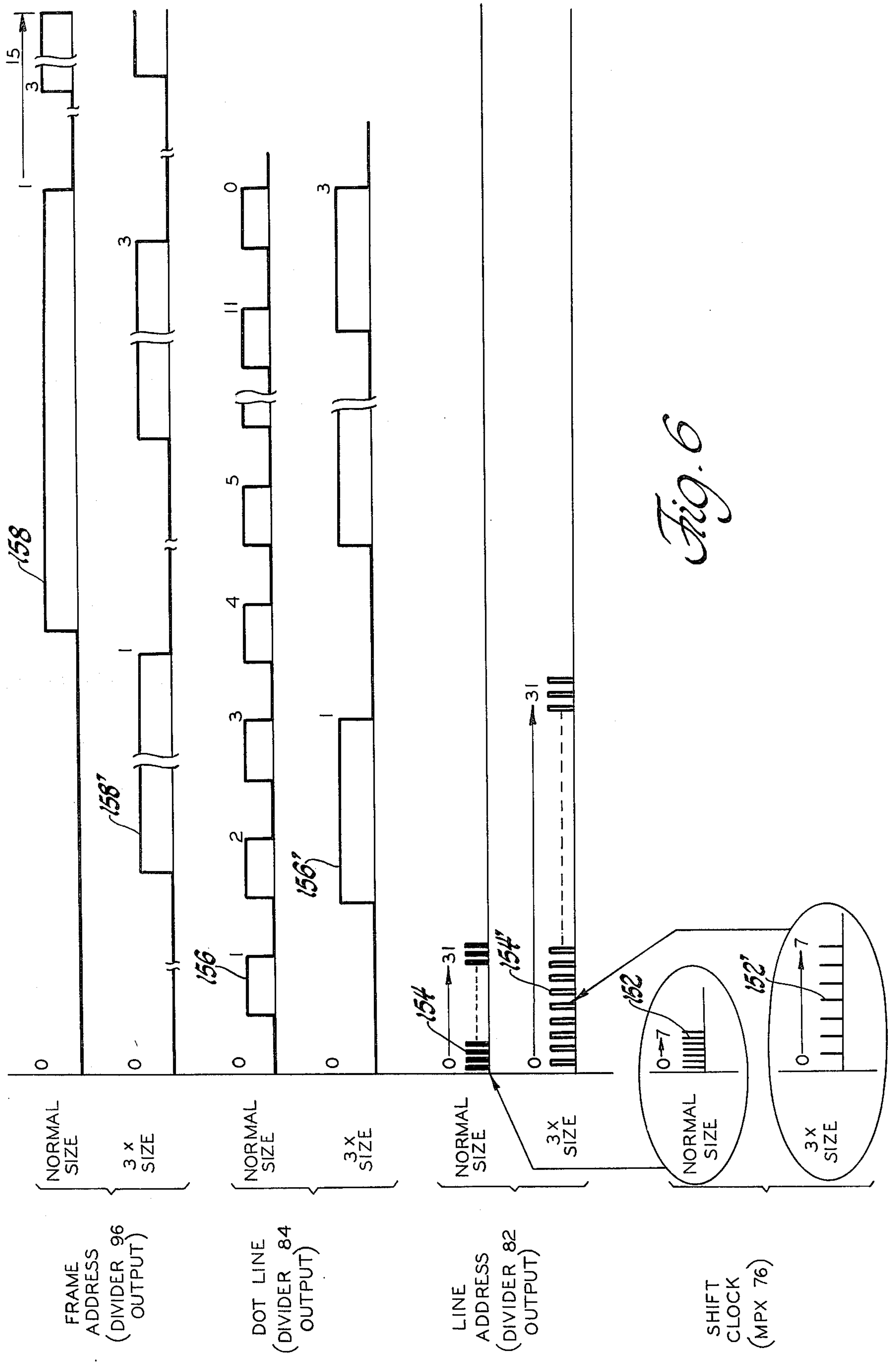
FIG. 6 is a timing diagram to aid the explanation of the invention.

The operation of the control system for producing a character display in both a "normal mode" and a "magnify mode" will now be described with reference to FIGS. 5 and 6. For the normal mode, the normal size character display is selected by placing the selector switch 116 in the "OFF" position. This causes the output of the multiplexer 76 to be the same as the output of the dot clock 46 and the output of the multiplexer 92 to be the same as the output of the divide-by-32 output of the counter 84. The output of the dot clock as shown in FIG. 6 is applied to the multiplexer 76. The output of the multiplexer 76 on conductor 134 is a shift clock signal to be used by the shift register 136 and is shown as a pulse train 152. The output of the multiplexer is applied to the divider 82 having a divisor of 8 which is equal to the number of dot columns per character. The output of the divider 82 is a pulse train 154 with each succeeding pulse corresponding to a succeeding character column on the face of the cathode ray tube. The pulses in the pulse train 154 are applied to the counter 84 and the output count thereof on the group of conductors 86 is the line position address. The divide-by-32 output of the counter 84 is a train of pulses 156 with each pulse corresponding to a different line of dots on the face of the cathode ray tube. In particular, one of the pulses in the train 156 is produced for each horizontal scan of a line of dots which is equivalent to 32 pulses in the pulse train 154. The output of the counter 84 is applied through the multiplexer 94 to the counter 96. The output count of this counter corresponds to the line number of the line of dots being scanned within a given character. This counter has a divide-by-12 output which is a train of pulses 158 in which each pulse corresponds to a character row within the frame. This divide-by-12 output is applied to the counter 104 and the output count thereof represents the frame position address. When the counter 104 has counted up to 16, the address generator has completed generation of all the addresses of the display and the counting process is repeated. generator When the line position address from the counter 84 and the frame position address from the counter 104 are supplied to the memory 42, the character code at that address is applied through the buffer 132 to the character generator 102. The character generator 102, at the same time, is supplied with the output of the counter 96. This count signifies which line of dots is to be generated within the character. Thus the character genrator will produce the dot pattern for the first dot line all the way across a row of characters, the dot pattern being outputted by the character generator for one character at a time in parallel fashion. This output is supplied to the shift register 136 and the output thereof is serialized in synchronism with the shift clock signal on conductor 134 and the serialized dot pattern is applied to the video amplifier 138. Thus as the electron beam scans a horizontal line of dots in the first row of characters, for example, the video amplifier selectively intensifies or brightens the dots as needed for that line of dots across the entire row of characters or spaces. The same control is produced for each succeeding line of dots within the frame until the output count of the counter 96 reaches 12 which signifies that the first row of characters has been generated. Then the same process is repeated for the next row of characters.

In the generation of normal size characters as just described, it will be appreciated that each character column with intercharacter spacing includes eight columns of dots and each character row with intercharacter spacing includes 12 rows of dots; each dot is caused to be bright or dark by the video amplifier to produce the character as illustrated in FIGS. 2 and 3. With reference to the timing diagram of FIG. 6, it is noted that when the line position address count and the frame position address count are at 0—0 the character code in sequence position number 1 is transferred from the memory to the buffer 132. This character code is supplied to the character generator until the line position transfer signal is generated on conductor 133 and the line position address is incremented which occur simultaneously after the first eight dot clock pulses. At that time the character code in the memory at the second sequence position is supplied to the buffer and thence to the character generator until the line address is again incremented. This is repeated until the line position address has been incremented through the 32nd sequence position, at which time the line position address counter stops. The counter is reset by the horizontal or line sync signal from the line sync circuit 48 and the counting starts over. The process is repeated for the next 32 increments of the line position address; however, the dot row counter 96 has been incremented by the divide-by-32 output from the counter 84 so that the output of the counter 96 causes the character generator 102 to shift to the next dot row within the character. The process is repeated until the scanning is completed for all twelve dot rows in the first character row. At this point, the divide-by-12 output of the dot row counter 96 will increment the counter 104 and hence the frame position address. When the frame position address is incremented, along with the line position address, the character code in the 33rd sequence position will be supplied from the memory to the buffer 132; this initiates the character generation for the second character row on the cathode ray tube. The second character is generarted in the same manner as just described for the first and, upon completion, the frame position address is again incremented. The process is repeated until the counter 104 is filled which occurs when all of the character rows on the cathode ray tube have been generated. At this time the end of frame is reached and the complete display has been generated. The display generation is repeated in the same manner according to the character data stored, at the time, in the memory.

The operation will now be described in the "magnify mode". When it is desired to convert the monitor display from normal size to magnified size, the selector switch 116 is actuated to the "ON" position. This causes the output of the NAND gate 114 to go low and the inputs of multiplexers 76 and 92 are switched, i.e. the second inputs are selected. The output of the multiplexer 76, i.e. the shift clock signal, is frequency divided by three. This output, in the form of a pulse train 152', is illustrated in FIG. 6 just below the shift clock pulse train 152 for normal size display. It is noted that it takes 24 dot clock pulses, instead of 8, to produce an output pulse on the counter 82. Thus, the line position address, as represented by pulse train 154', is incremented for every 24 dot clock pulses. Therefore, in the magnify mode, the divide-by-32 output of the counter 84 produces only one pulse corresponding to the three pulses in the normal mode. The divider 94 divides this output by three so that, in the magnify mode, the output of the divider is transmitted through the multiplexer 92 and produces only one pulse for every three pulses produced by the divide-by-32 output of counter 84. Accordingly, the counter 96 is incremented at one-ninth the rate for 3 times size, as for normal size. Further, the output of the divider 84 produces a pulse train 156' which has only one pulse for every three pulses in the pulse train 156. The output of counter 104 is accordingly incremented at one-ninth the rate for magnified size as it is for the normal size. Therefore, the pulse train 158' has only one pulse for every three pulses in the pulse train 158.

This change in the timing relationship in the magnify mode of operation causes the generation of magnified characters as follows. When the line address count and the frame address count are at 0—0, the character code which is in sequence position number 1 in the memory is transferred to the buffer 132. This character code is supplied to the character generator until the line position transfer signal is generated and the line position address is incremented on conductor 133 which occur simultaneously after the first eight shift clock pulses, as in pulse train 152'. This corresponds to 24 dot clock pulses. Accordingly, the character generator 102 is operated to hold the output on each of its parallel output lines for a duration of three dot clock pulses. This causes the width of each character element to be three dots wide for magnified size, rather than one dot wide for the normal size, as illustrated in FIGS. 1 and 2. When the line position address is incremented, the character code in the memory at the second sequence position is supplied to the buffer and thence to the character generator. This process is repeated until the line position address has been incremented through the tenth sequence position, at which time the line position address counter is reset by a signal from the line sync circuit 48. The process is then repeated for the next 10 increments of the line position address. It is noted that the dot line counter 96 is incremented by one for ever three output pulses from the divide-by-32 output of the counter 84. Thus the character generator 102 is caused to produce the same sequence of signals on its output lines for three succeeding repetitions of the line scan in the cathode ray tube. As a result, each character element is given a height of three dots for the magnified character, instead of the height of one dot for the normal character, as illustrated in FIGS. 1 and 2. This process is repeated until the dot line counter 96 has been incremented twelve times by the output of the multiplexer 92. This results in the scanning of twelve sets of three dot lines for the first row of characters. When the dot line counter 96 is filled, the divide-by-12 output thereof will increment the frame position address produced by the counter 104. This causes the process just described to be repeated for the next row of characters. The process is repeated for four successive character rows, each being of three times normal size. At this point, the frame position address from counter 104 will be incremented to a count of 4. The output of the counter 104 is used to restore the display to the normal size for the remainder of the display. For this purpose, as mentioned above, the counter output conductor which represents the next most significant bit of the counter output, is connected to the inputs of the inverter 130. When the frame position count is incremented to 4, the input to the inverter will go to a logical high and will remain at logical high for the next four frame position increments. Accordingly, the output of the gate 114 will go low. This causes both frequency dividers 78 and 94 to remove from the circuit for the remainder of the frame and the last four character rows are reduced to normal size. The frame address counter 104 reaches a count of 8 and stops. The counter is then reset by the vertical sync signal from the frame synchronizing circuit 54. The succeeding frame is produced in the same manner with four character rows at the magnified character size and this is repeated so long as the selector switch 116 is in the "ON" position.

Although the description of this invention has been given with reference to a particular embodiment, it is not to be construed in a limiting sense. Many variations and modifications will now occur to those skilled in the art. For a definition of the invention, reference is made to the appended claims.

The embodiments of the present invention in which an exclusive property or privilege is claimed are defined as follows:

1. A display for alphanumeric characters comprising a cathode ray tube having a screen with luminescent dots in a rectangular array whereby a character display is produced by brightening selected dots in plural character columns and rows, a dot clock for generating a train of dot clock pulses at a predetermined frequency, means connected with the clock means and with the cathode ray tube for causing the cathode ray to scan the screen in a predetermined raster in timed relation with said clock pulses, dot signal means for producing a dot signal which has a pulse or a space corresponding to each clock pulse, intensity control means connected with the cathode ray tube and the dot signal means for brightening the trace of the ray on the screen in response to a pulse and for darkening it in response to a space, a memory for storing character codes representing a plurality of characters which are to be displayed at predetermined locations on said screen, a character generator for sequentially producing plural binary signals each representing a row of dots of a character to be displayed, a shift register connected between the character generator and the dot signal means, a buffer connected between said memory and said character generator, an address generator including a first frequency divider having its input connected with the dot clock for counting character columns, a line position address counter having a counter output and a divider output, a character line counter having a counter output and a divider output, and a frame position address counter having a counter output, all of said dividers and counters being connected in cascade in the order named with respect to their inputs and divider outputs, the counter output of the line position address counter and the counter output of the frame position address counter being connected with said memory for advancing the output of the memory from one character code to the next, the counter output of said character line counter being connected with said character generator for advancing the output thereof from one dot line to the next, the output of said first divider being connected with said buffer for transferring one character at a time from the memory to said character generator, the input of said first divider being connected with said shift register for serially applying the output of the character generator to the input of said dot signal means, whereby a character of a certain normal size is produced on said screen, a second frequency divider selectably connectable between said dot clock and the input of said first divider and a third frequency divider selectably connectable between the divider output of said line position address counter and the input of said character line counter, switching means for simultaneously actuating said second and third dividers whereby a character of magnified size is produced on said screen.

2. The invention as defined in claim 1 wherein said screen is adapted to display plural columns of characters and plural rows of characters, said memory having a capacity to store character codes sufficient to fill a plurality of rows of characters on said screen, said switching means including a first multiplexer having first and second inputs, the output of said dot clock being connected to the first input of the first multiplexer and the output of said dot clock being connected through said second frequency divider to the second input of said first multiplexer, the first multiplexer having an output connected with the input of the first frequency divider and having a selector input, a second multiplexer having first and second inputs, the divider output of the line position address counter being connected with the first input and being connected through said third frequency divider to the second input of the second multiplexer, said second multiplexer having an output connected with the input of said character line counter and having a selector input, said switching means also including a logic gate having first and second inputs and having an output connected with the selector inputs of said first and second multiplexers, a manual switch connected with one input of said logic gate for causing the output thereof to switch the multiplexers to apply the first inputs thereof to the respective outputs thereof to produce a display of magnified characters, the counter output of said frame position address counter being connected with the other input of said logic gate for causing the output thereof to switch said multiplexers to apply the second inputs thereof to the respective outputs thereof to produce characters of normal size after a given frame position address has been reached.

* * * * *